(12) United States Patent
Tissot et al.

(10) Patent No.: US 8,149,088 B2
(45) Date of Patent: Apr. 3, 2012

(54) OPTICAL BIOMETRIC ACQUISITION DEVICE WITH INFORMATION DISPLAY INTENDED FOR THE USER

(75) Inventors: Nicolas Tissot, Cormeilles en Parisis (FR); Eric Saliba, Châtou (FR)

(73) Assignee: Sagem Securite, Paris (FR)

( * ) Notice: Subject to any disclaimer, the term of this patent is extended or adjusted under 35 U.S.C. 154(b) by 1013 days.

(21) Appl. No.: 11/813,070

(22) PCT Filed: Dec. 22, 2005

(86) PCT No.: PCT/FR2005/003249
§ 371 (c)(1),
(2), (4) Date: Apr. 23, 2008

(87) PCT Pub. No.: WO2006/070119
PCT Pub. Date: Jul. 6, 2006

(65) Prior Publication Data
US 2009/0123038 A1     May 14, 2009

(30) Foreign Application Priority Data
Dec. 28, 2004   (FR) .................................... 04 13987

(51) Int. Cl.
*G06K 9/00* (2006.01)
(52) U.S. Cl. ....... 340/5.83; 340/5.53; 382/124; 382/127
(58) Field of Classification Search ................ 340/5.53, 340/5.83; 382/124, 127; 250/208.01; 356/71; 345/7, 87
See application file for complete search history.

(56) References Cited

U.S. PATENT DOCUMENTS

| 3,975,711 | A | 8/1976 | McMahon |
| 5,187,748 | A | 2/1993 | Lee |
| 6,185,319 | B1 * | 2/2001 | Fujiwara ........................ 382/127 |
| 6,191,410 | B1 * | 2/2001 | Johnson ...................... 250/208.1 |
| 6,452,577 | B1 * | 9/2002 | Gale et al. ........................ 345/87 |
| 6,567,539 | B1 | 5/2003 | Benezeth |
| 7,418,117 | B2 * | 8/2008 | Kim et al. ...................... 382/124 |
| 2001/0054988 | A1 * | 12/2001 | Cone et al. ......................... 345/7 |
| 2003/0062490 | A1 * | 4/2003 | Fujieda .......................... 250/556 |

FOREIGN PATENT DOCUMENTS

| GB | 2331613 | 5/1999 |
| WO | WO 00/38096 | 6/2000 |
| WO | WO 02/077907 | 10/2002 |

OTHER PUBLICATIONS

Igaki, Seigo et al., "Holographic Fingerprint Sensor", Fujitsu Scientific & Technical Journal, 25 (1989) Winter, No. 4, Kawasaki, JP, pp. 287-296.
PCT International Application Search Report, PCTFR2005/003249, dated Jul. 18, 2006.

* cited by examiner

*Primary Examiner* — Edwin Holloway, III
(74) *Attorney, Agent, or Firm* — McDonnell Boehnen Hulbert & Berghoff LLP

(57) ABSTRACT

The invention concerns a biometric capture optical device (1) comprising a prismatic optical element (2) having one side (4) appearing in a window (3) to provide a support surface for a bodily limb and illuminating means (6) designed to illuminate the side (4) from within the element (2) and form by total reflection a biometric image of the bodily limb; in addition, luminous information display means are located beneath the element (2) opposite the window (3) so as, in the absence of the bodily limb on the side (4), to transmit, without total reflection, through the window (3) a luminous information image visible from outside (15).

3 Claims, 5 Drawing Sheets

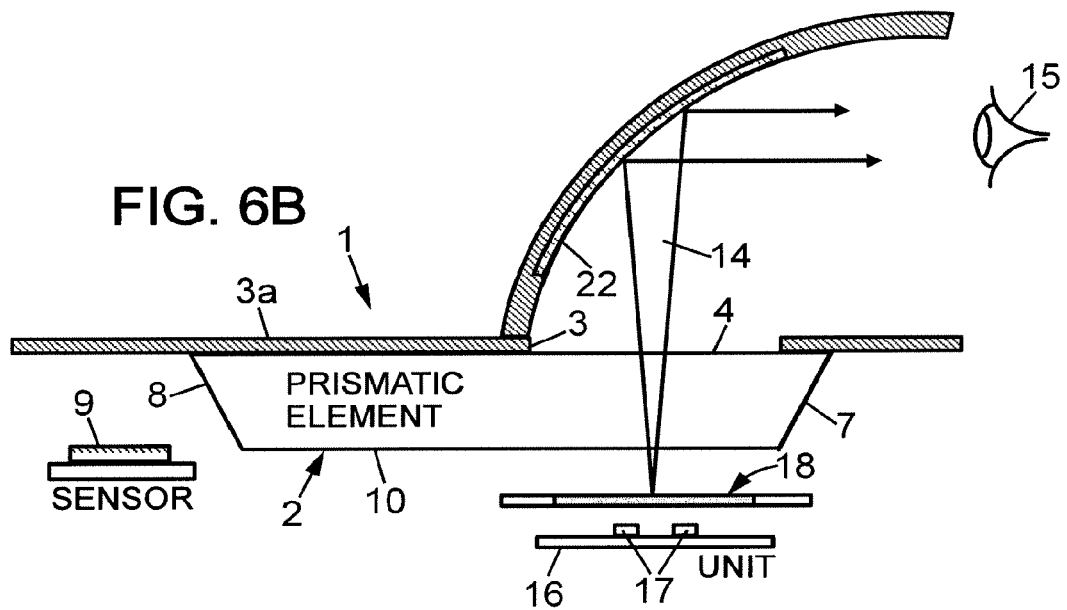

OPTICAL BIOMETRIC ACQUISITION DEVICE WITH INFORMATION DISPLAY INTENDED FOR THE USER

The present invention relates to the general field of biometric acquisition, in particular obtaining fingerprints, and it more particularly relates to improvements made to optical biometric acquisition devices comprising a prismatic optical element of which at least a part of one face appears in a window and constitutes an application surface for the placement of a body member of which a biometric image is intended to be formed and illumination means arranged with respect to the prismatic optical element so that they illuminate said window from inside the prismatic optical element, and, if there is a body member placed on said application surface of the window, they form a biometric image of said body member by total reflection.

Optical biometric acquisition devices are being employed ever more widely for controlling access by authorized persons (authorization to enter premises, authorization to use equipment, etc.).

It is common for these devices to have a display capable of providing one or more items of information to users, such as an indication of the availability or unavailability of the device, an indication of what the user should do (for example "press the right index finger"), an indication regarding the success or failure of the recognition operation, etc. These items of information may be alphanumeric and/or symbolic.

In current devices, the display is arranged inside the window delimiting the application surface for a finger. The consequence of this is that the housing which encloses the assembly is relatively large.

At least for certain working configurations, it is desirable for the device, including its display, to be held in a housing which is smaller and less cumbersome.

Furthermore, there are also optical biometric acquisition devices which do not have any means for displaying information intended for users. These devices are less cumbersome than the previous ones. In certain cases, it is desired to be able to make an enhanced version of them equipped so that information can be presented to users, without increasing the dimensions of the housing.

It is an object of the invention to provide a solution making it possible to satisfy the practical requirements and, to this end, to provide an optical biometric acquisition device which, while being held in a housing of relatively small dimensions, can provide a display of information intended for users.

To this end, the invention provides an optical biometric acquisition device as mentioned in the preamble which, being arranged according to the invention, is characterized in that it furthermore comprises means for presenting luminous information which are arranged under the prismatic optical element and approximately next to said window so that they transmit an externally perceptible image of luminous information through the window without total reflection.

By virtue of this arrangement, the luminous information appearing through said window can be perceived by an observer when there is no body member placed on said application surface. In other words, the window is used selectively for transmitting luminous information either by total reflection to transmit the biometric image when a body member is placed on the outside surface, or by refraction to transmit luminous information intended for users if there is no body member placed on said surface. The device can thus be produced in a compact form, which is less cumbersome than the prior devices with a lateral display, while devices which do not have a display for presenting information can be equipped with one without increasing the volume of the housing.

Irrespective of the means which are actually employed, as will be explained below, it is desirable for the device to comprise control means capable of inhibiting the means for presenting luminous information when a body member is placed on said application surface, so that the presentation of the luminous information (which in any case is not perceptible by the user because the body member obscures a large part of the window) does not interfere with the light beam carrying the biometric image during operation in biometric acquisition mode.

In a particularly beneficial embodiment which is more specifically envisaged in the scope of the invention, the prismatic optical element comprises two substantially parallel faces of which one, on the outside, is associated with said window and an inclined side face which is black; located next to the other, on the inside, of the parallel faces and next to said window are the illumination means (in biometric acquisition mode, the body member placed on the outside surface of the window, in conjunction with the inclined black face, causes total reflection of the light transmitting the biometric image) and the means for presenting luminous information (when there is no body member placed on said outside face of the window, the light conveying the information passes through said face of the window).

For simple and compact implementation of this arrangement, the illumination means comprise light-emitting diodes arranged in a panel substantially parallel to said inside face of the prismatic optical element, and a transparent LCD screen is interposed between said panel of diodes and said inside face of the prismatic optical element, whereby, when there is a body member placed on said application surface, the illumination means illuminate said body member through the transparent LCD screen and provide a biometric image of it by total reflection, while when there is no body member placed on said application surface, the illumination means pass through the LCD screen which is then controlled to present information and provide luminous information to an observer after passing through the prismatic optical element.

Advantageously in this case, it is beneficial for the device furthermore to comprise a convergent focusing optical member which is arranged between the LCD screen and said inside face of the prismatic optical element.

This arrangement can give rise to various embodiments. In a preferred embodiment, the convergent optical member may be capable of focusing the image of luminous information either onto a screen located approximately above said window, or at a distance adapted for direct visual perception by an observer. A beneficial embodiment may relate to a device equipped with a visor, known per se, for protecting against stray ambient illumination arranged above said window; in this case, at least a part of said visor next to said window consists of a translucent material, and the convergent optical member is capable of focusing an image of the luminous information onto said translucent part of the visor or through it at a distance adapted for direct visual perception by an observer, whereby the user in control of the visor readily perceives the information which appears on or through it.

In a compact embodiment which is simple to manufacture, it is beneficial for the convergent optical member to be integrated into the inside face of the prismatic optical element.

The invention will be understood more clearly on reading the following detailed description of certain preferred embodiments of the invention, which are given purely by way of illustration. In this description, reference is made to the appended drawings in which:

FIGS. 6A and 6B are schematic views similar to FIGS. 4A and 4B, according to yet another alternative embodiment.

Figure 1A:
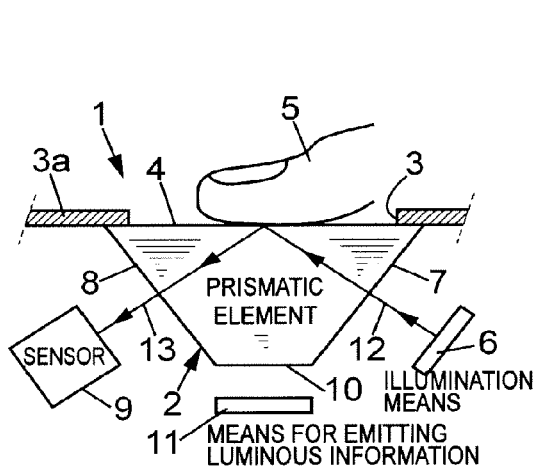
FIGS. 1A and 1B are highly schematic views illustrating in a simplified way the fundamental arrangements of an optical biometric acquisition device arranged according to the invention, shown respectively in two different functional situations.

As schematized in FIG. 1A, an optical biometric acquisition device denoted in its entirety by the reference 1 comprises:

a prismatic optical element 2 of which at least a part of a main face 4 appears in a window 3 (for example defined by a cover 3a) and constitutes an application surface for the placement of a body member 5 (for example the tip of a finger of the hand) of which a biometric image is intended to be formed and illumination means 6 arranged with respect to the prismatic optical element 2 so that they illuminate said face 4 in the window 3 from inside the prismatic optical element.

In the schematic example of FIG. 1A, the illumination means 6 are arranged next to a side face 7 of the prismatic optical element 2, so that the illuminating radiation reaches the side face 6 substantially perpendicularly and enters by refraction into said prismatic optical element 2 substantially without significant deviation.

Next to the other side face 8 and substantially parallel to it, there is a radiation sensor 9.

Lastly, next to the small face 10 (located on the opposite side from the main face 4 and substantially parallel to it) of the prismatic optical element 2, there are means 11 for emitting luminous information which are capable of emitting a light beam carrying information when they are activated.

In the functional situation shown in FIG. 1A, a body member 5, such as a finger, is placed on the part of said face 4 defined by the window 3. The illumination means, which are activated, emit radiation 12 which by entering into the prismatic optical element through the side face 7 illuminates the face 4 and is reflected with total reflection because of the presence of the body member 5 placed on said face 4.

The reflected radiation 13, conveying the biometric image of the body member 5, arrives on the other side face 8 substantially perpendicularly to it, leaves the prismatic optical element 2 by refraction without significant deviation and reaches the sensor 9.

In this functional situation of the device, the means 11 for emitting luminous information are preferably not activated, so that the light which they emit does not interfere with the radiation 12 for illuminating the body member 5.

Figure 1B:
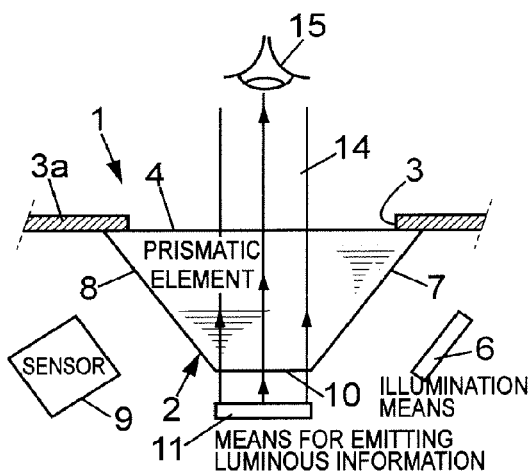

Outside the period of time during which a body member 5 is placed on the part of the face 4 defined by the window 3 with a view to biometric acquisition, the illumination means 6 may preferably be turned off as shown in FIG. 1B, while the means 11 for emitting luminous information are activated. The light 14 which they emit passes through the small face 10 and the main face 4 substantially perpendicularly to them, so that an observer 15 located next to the window 3 perceives luminous information as generated by the means 11.

Control means (not shown) should in this context be provided in order to selectively control the activation of the illumination means 6 and the activation of the means 11 for emitting luminous information, depending on whether or not a body member 5 is placed on the part of the face 4 defined by the window 3.

The arrangement which has just been described makes it possible to acquire a biometric image of the body member 5 conventionally, while in the absence of a body member, the device emits luminous information intended for users (for example a signal of availability or unavailability of the apparatus, information regarding the action to be performed, etc.). According to the invention, the same optical devices are capable of fulfilling both functions in a much more compact form than the current devices employing two juxtaposed windows.

Figure 2A:
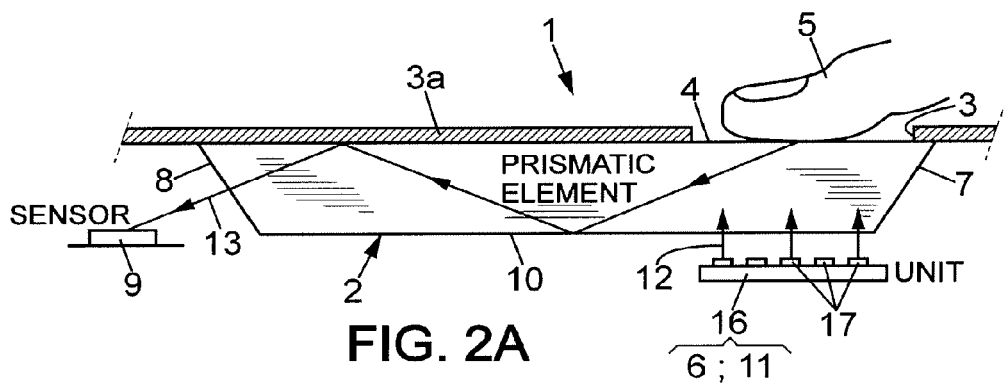
FIGS. 2A and 2B are schematic views of a beneficial embodiment of an optical biometric acquisition device arranged according to the invention, shown respectively in two different functional situations.
Figure 2B:
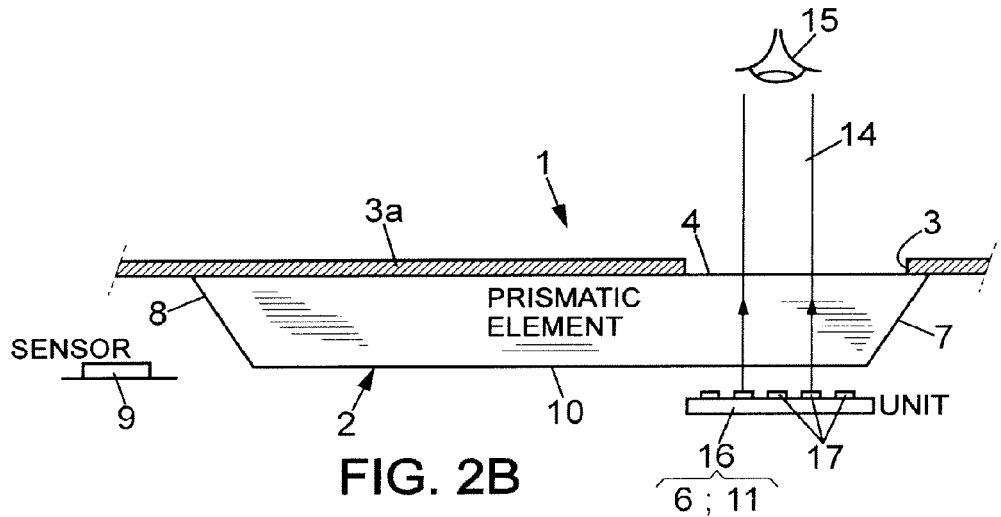

FIGS. 2A and 2B (in which the same numerical references are retained for denoting members or parts which are similar to the respective ones in FIGS. 1A and 1B) illustrate a practical embodiment of the basic arrangements which have just been explained.

The prismatic optical element 2 is of an elongate type, with the window 3 located in the vicinity of the inclined face 7 on the opposite side from the inclined face 8 for output of the radiation 13 conveying the biometric acquisition image. The face 7 is black so as to constitute a total reflection face inside the prismatic optical element 2. Lastly, the illumination means and the means for emitting luminous information which were mentioned above are combined in a single unit 16 organized in the form of a panel arranged substantially parallel to the lower face 10 of the prismatic optical element 2. This unit 16 may in practice consist of a matrix of light-emitting diodes 17.

In the functional situation shown in FIG. 2A, a body member 5 such as a finger is placed on the part of said face 4 defined by the window 3. At least a certain number of the diodes 17, which are activated, emit radiation 12 which, entering into the prismatic optical element through the inside face 10, illuminates the face 4 and is reflected with total reflection because of the contact of the body member 5 placed on said face 4; the biometric image of the body member 5 appears on a black background generated by the side face 7, which is black (the ridges of the fingerprint appear in white and the furrows in black). The reflected radiation 13 travels along the entire length of the prismatic optical element 2 by multiple total reflections on its opposite faces 4 and 10 until it emerges through the other side face 8 to reach the sensor 9.

Outside the period of time during which a body member 5 is placed on the part of the face 4 defined by the window 3 with a view to biometric acquisition, as shown in FIG. 2B, the diodes which were used for illumination in the functional situation of FIG. 1A, or some of them, are now turned off and other diodes of the unit 16, or some of the diodes which were used for the illumination, selected so as to reproduce an informative signal or predetermined text, are activated. The light 14 which they emit passes through the inside face 10 and the main face 4 substantially perpendicularly to them, so that an observer 15 located next to the window 3 perceives luminous information.

Figure 3A:
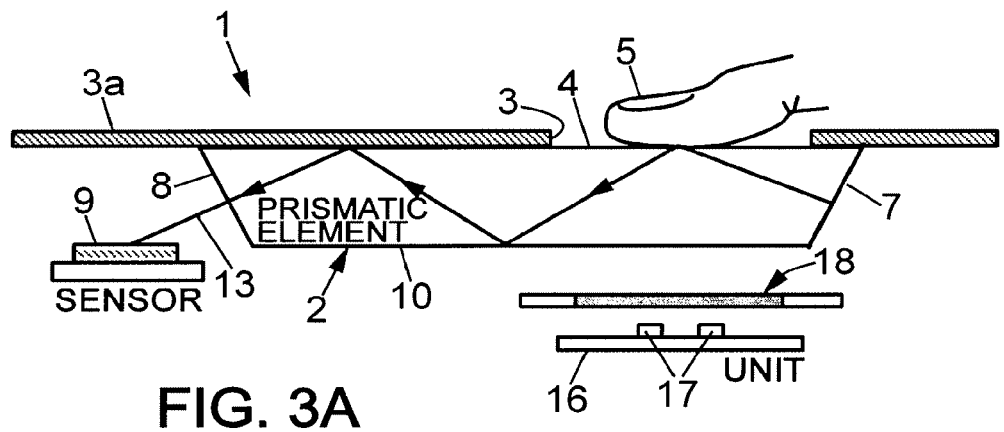
FIGS. 3A and 3B are schematic views of a preferred embodiment of the device in FIGS. 2A and 2B, shown respectively in two different functional situations.
Figure 3B:
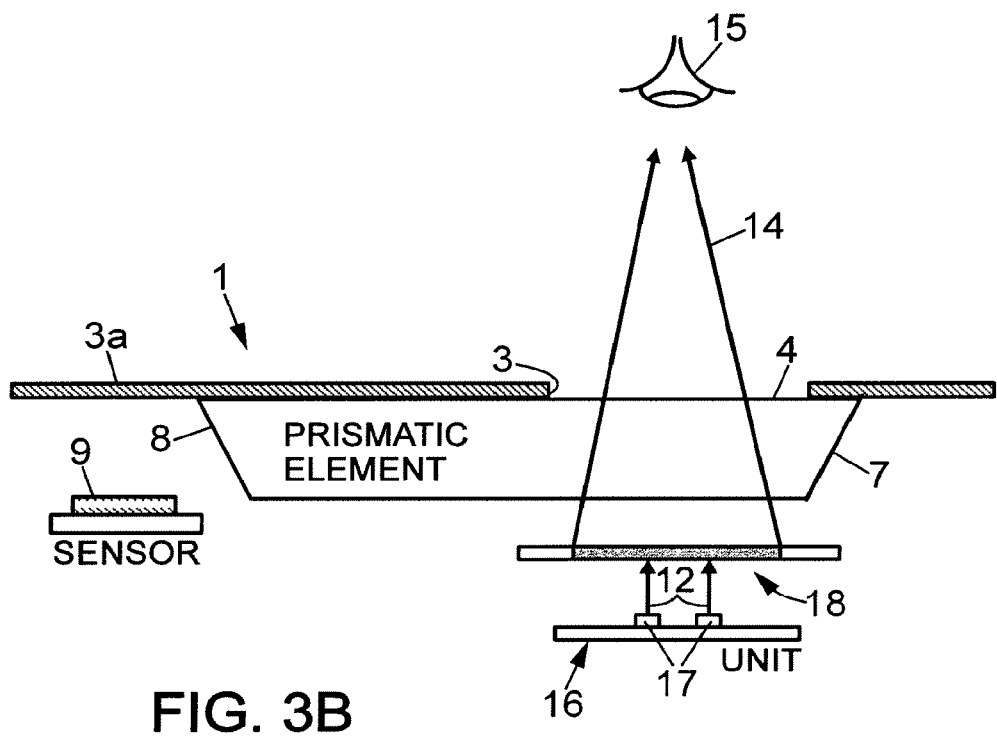

FIGS. 3A and 3B illustrate a preferred embodiment of the arrangement in FIGS. 2A and 2B. In combination with the unit 16 of light-emitting diodes 17, still arranged in the form of a panel substantially parallel to the lower face 10 of the prismatic optical element 2, this preferred embodiment involves a transparent LCD screen 18 interposed between the unit 16 and the face 10.

In the functional situation shown in FIG. 3A, a body element 5 such as a finger is placed on the part of said face 4 defined by the window 3. All the diodes 17 of the unit 16 are activated and emit radiation 12 which, entering into the prismatic optical element 2 through the lower face 10, illuminates the face 4 and is reflected with total reflection under the same conditions as before.

Outside the period of time during which a body member 5 is placed on the part of the face 4 defined by the window 3 with a view to biometric acquisition, as shown in FIG. 3B, all the diodes or at least a sufficient number of them are kept activated and the light which they emit passes through the transparent LCD screen. This light 14, conveying the information displayed by the LCD screen 18, the prismatic optical element 2 from which it emerges through the main face 4, substantially perpendicularly to it.

The preferred embodiment shown in FIGS. 3A and 3B is particularly beneficial because of the compactness which makes it possible to obtain and the limited modifications which it entails in relation to the current devices.

It will be emphasized that the control of the device which has just been described with reference to FIGS. 3A and 3B is simplified: the unit 16 remains permanently in operation and the light which it emits is used selectively for the biometric application of or the presentation of information, depending on whether or not a body member 5 is placed on the face 4. In order to prevent permanent presentation of the information, including during the biometric acquisition sequences, from interfering with the radiation conveying the biometric acquisition image, provision may advantageously be made for the transparent LCD screen 18 to be activated only when a body member is not applied on the face 4 and for it not to be activated during the biometric acquisition process (the LCD screen 18 then being entirely transparent).

Figure 4A:
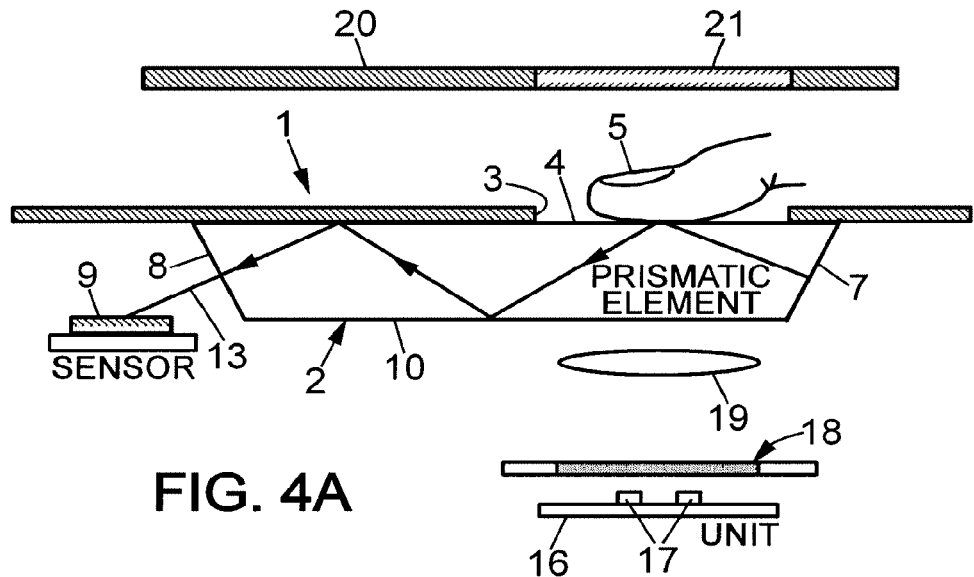
FIGS. 4A and 4B are schematic views similar to FIGS. 3A and 3B, according to an alternative embodiment.
Figure 4B:
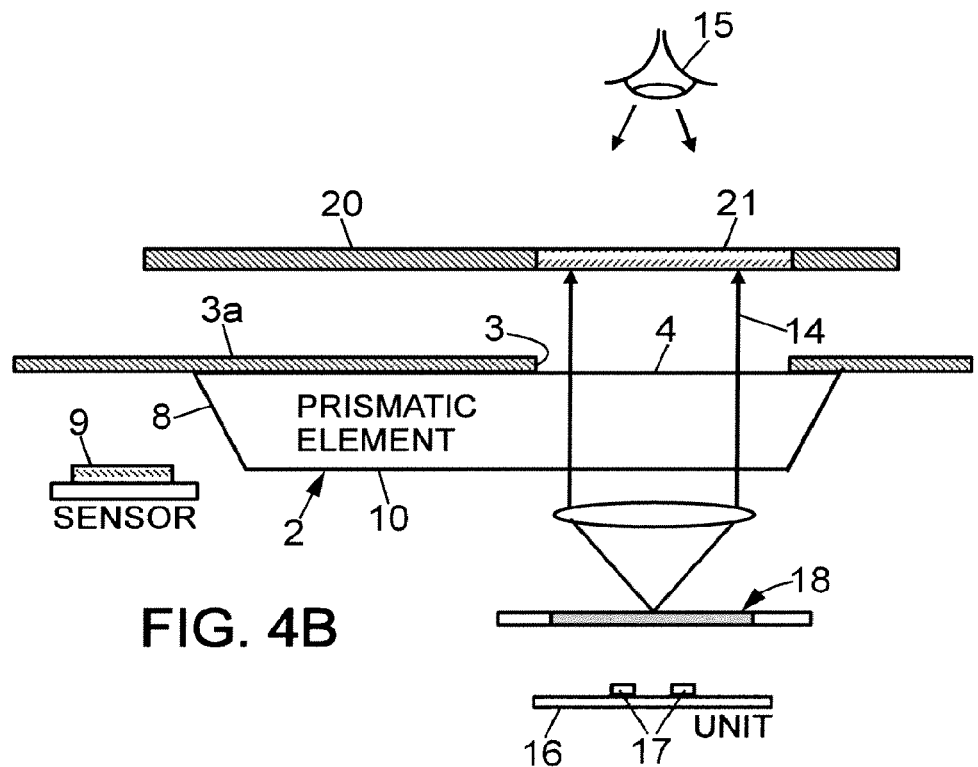

FIGS. 4A and 4B illustrate a variant of the embodiment illustrated in FIGS. 3A and 3B. According to this variant, a convergent optical element 19 (typically a converging lens) is interposed between the LCD screen 18 and the face 10 in order to focus the information displayed by the LCD screen 18. In other regards the structure of the assembly is unchanged, except that, in the context of this variant, provision may advantageously be made for the convergent optical element 19 to be capable of focusing the light 14 so that the information image which it conveys is formed on a screen located above the window 3 or at a distance adapted for direct visual perception by the observer, so that the user can observe this image focused on the screen or above it.

Expediently, according to the invention the screen is not an additional piece attached on the apparatus, but quite simply consists of a protective visor 20 known per se for protecting the apparatus against stray illumination (ambient light, sunlight). Provision is then made for a part of this visor 20 located next to the window 3 to be formed from a translucent material so as to constitute a port 21, on the outside face of which or through which the information image appears and is then made visible to the observer 15.

Figure 5:
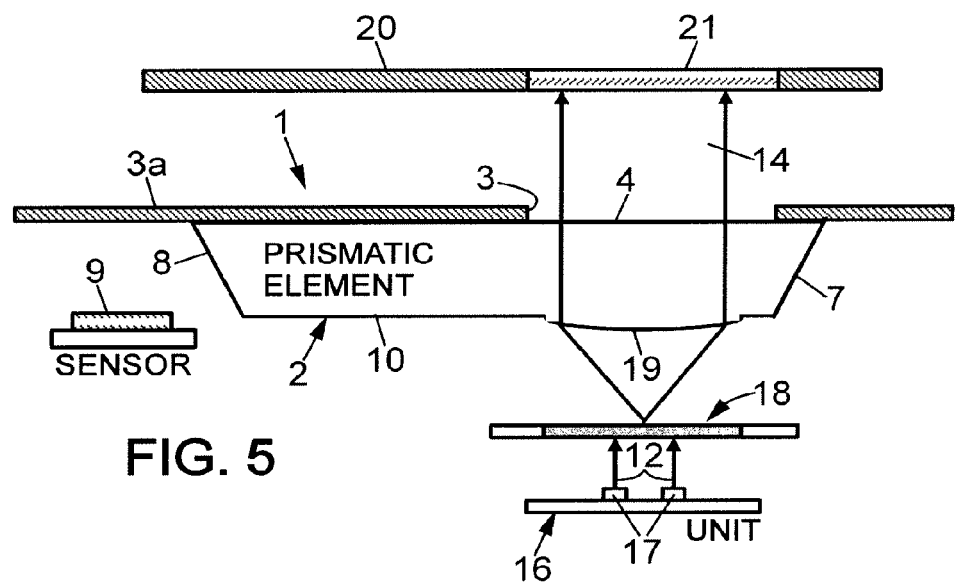
FIG. 5 is a partial schematic view illustrating a preferred embodiment of a part of the device in FIGS. 4A and 4B.

FIG. 5 shows a beneficial and preferred alternative embodiment according to which the convergent optical element 19 is incorporated into the inside face 10 of the prismatic optical element 2, so that there is then only a single optical element to manufacture and install during assembly. As a variant, it is feasible to adhesively bond an attached device onto the lower face 10 of the prismatic optical element 2, for instance a Fresnel lens, fulfilling the same function as the incorporated convergent optical element 19 mentioned above. In yet another variant, it is the port 21 which constitutes the convergent optical element.

Figure 6A:
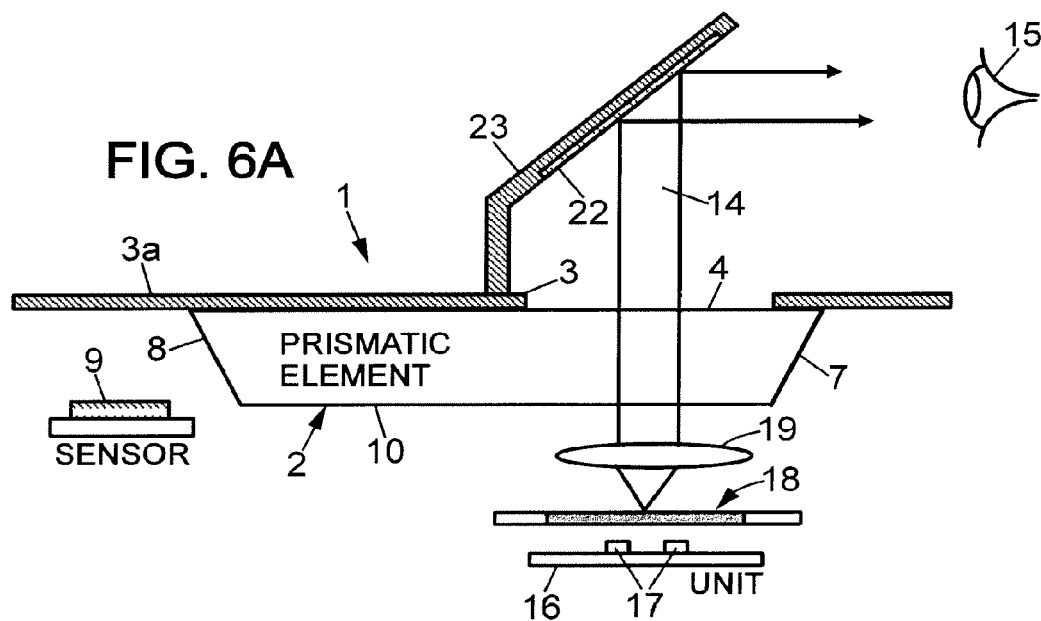

FIGS. 6A and 6B show yet another embodiment, according to which the information displayed by the LCD screen 18 reaches the observer 15 not directly, but after having experienced reflection on a reflective surface 22 arranged in line with the face 4 and inclined with respect to it, this reflective surface being either plane (FIG. 6A) in which case it may be advantageous to provide a focusing lens 19 as before, or concave (FIG. 6B) in which case the focusing is carried out by the surface 22 itself. In the example illustrated in FIGS. 6A and 6B, the reflective surface 22 is carried by a visor 23 mounted on the cover 3a or formed integrally with it.

The invention claimed is:

1. An optical biometric acquisition device comprising:
   a prismatic optical element comprising two opposite faces and of which at least a part of one face appears in a window and constitutes an application surface for placement of a body member of which a biometric image is intended to be formed, and
   illumination means arranged with respect to the prismatic optical element so that the illumination means illuminates said window from inside the prismatic optical element, and, if there is a body member placed on said application surface of the window, they form a biometric image of said body member by total reflection,
   means for presenting luminous information which are arranged under the prismatic optical element and approximately next to said window so that they transmit an externally perceptible image of luminous information through the window without total reflection,
   whereby the image of luminous information appearing through said window can be perceived by an observer when there is no body member placed on said application surface, wherein the means for presenting luminous information are separated from the illumination means and wherein the device comprises control means capable of inhibiting the means for presenting luminous information when a body member is placed on said application surface.

2. The device as claimed in claim 1, wherein it further comprising a convergent focusing optical member consisting of a port formed in a screen located approximately above said window.

3. The device as claimed in claim 1, comprising a visor having a reflective surface, inclined with respect to the application surface for placement of the body member, capable of reflecting the luminous information.

* * * * *

UNITED STATES PATENT AND TRADEMARK OFFICE
CERTIFICATE OF CORRECTION

PATENT NO.       : 8,149,088 B2
APPLICATION NO.  : 11/813070
DATED            : April 3, 2012
INVENTOR(S)      : Nicolas Tissot and Eric Saliba It is certified that error appears in the above-identified patent and that said Letters Patent is hereby corrected as shown below:

Title Page, item (73) Assignee:

Delete "Sagem Securite, Paris (FR)," and replace with "MORPHO, Paris (FR),"

Signed and Sealed this
Twenty-fifth Day of June, 2013

Teresa Stanek Rea
*Acting Director of the United States Patent and Trademark Office*